United States Patent [19]

Horner

[11] Patent Number: 5,024,508
[45] Date of Patent: Jun. 18, 1991

[54] AMPLITUDE ENCODED PHASE-ONLY FILTERS FOR OPTICAL CORRELATORS

[75] Inventor: Joseph L. Horner, Cambridge, Mass.

[73] Assignee: United States of America as Represented by the Secretary of the Air Force, Washington, D.C.

[21] Appl. No.: 335,634

[22] Filed: Apr. 4, 1989

[51] Int. Cl.$^5$ .................. G02B 27/46; G03H 1/16; G06E 3/00
[52] U.S. Cl. .................. 350/162.13; 350/3.82; 364/822
[58] Field of Search .................. 350/162.13, 162.12, 350/162.14, 3.67, 3.82; 364/822

[56] References Cited

U.S. PATENT DOCUMENTS

| | | | |
|---|---|---|---|
| 4,588,260 | 5/1986 | Horner | 350/162.13 |
| 4,765,714 | 8/1988 | Horner et al. | 350/162.13 |
| 4,826,285 | 5/1989 | Horner | 350/162.13 |

OTHER PUBLICATIONS

Joseph L. Horner and James R. Leger "Pattern recognition with binary phase-only filters", *Applied Optics*, vol. 24, No. 5, pp. 609–611, Mar. 1985.
Joseph L. Horner and Peter D. Gianino "Phase-only matched filtering", *Applied Optics*, vol. 23, No. 6, pp. 812–816, Mar. 15, 1984.

*Primary Examiner*—Bruce Y. Arnold
*Assistant Examiner*—James Phan
*Attorney, Agent, or Firm*—Robert L. Nathans; Donald J. Singer

[57] ABSTRACT

Method allows a first phase-only optical correlator filter function to be written on an amplitude modulating device such as a spatial light modulator (SLM) by applying a bias term to the phase only filter function great enough to obtain a second amplitude encoded filter function, for use with a more economical amplitude responsive SLM.

19 Claims, 1 Drawing Sheet

AMPLITUDE ENCODED PHASE-ONLY FILTERS FOR OPTICAL CORRELATORS

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of optical correlators, and more specifically to phase-only filters for use in optical correlators.

Previous work has shown that phase-only (POF) and binary phase-only (BPOF) optical filters have much larger, sharper correlation peaks than classically matched filters; see J. L. Horner and P. D. Gianino, "Phase-only Matched Filtering", Appl. Opt. 23, 812 (1984) and J. L. Horner and J. R. Leger, "Pattern Recognition with Binary Phase-only Filters", Appl. Opt. 24, 609 (1985). In addition, phase-only filters have 100% light throughput and when implemented on an electrically addressed spatial light modulator (SLM) in a realtime system, require approximately 1/25 of the memory storage space of a holographic matched filter. Up until now the BPOF, also described and claimed in my U.S. Pat. No. 4,765,714 incorporated by reference, had to be implemented on a phase-modulating SLM.

It is an object of the present invention to provide a novel and simple method which allows phase-only filters to be written on an amplitude modulating device, as most SLMs are, photographic film, or a VLSI photomask. For example, this allows a researcher who doesn't own the more expensive phase-only SLM to implement a POF or BPOF. He or she can generate the filter on a PC, then photograph the output CRT screen or use an inexpensive liquid crystal television.

SUMMARY OF A PREFERRED EMBODIMENT OF THE INVENTION

The method of the present invention causes a DC bias to be added to the phase-only or binary phase-only filter function. Correlation experiments and computer simulations were successfully performed with the resulting amplitude encoded binary phase-only filter (AE-BPOF) and compared to a binary phase-only filter (BPOF). Although the correlation peak to secondary maximum ratio was somewhat lower, these experiments show that this technique can be used successfully with an amplitude modulating SLM.

BRIEF DESCRIPTIONS OF THE DRAWINGS

Other objects, features and advantages of the invention will become apparent upon study of the following description, taken in conjunction with the drawings in which:

FIG. 1 discloses an optical correlator; and
FIGS. 2a–2d disclose various data in graphic form.

DETAILED DESCRIPTION OF PREFERRED EMBODIMENTS

Figure 1:
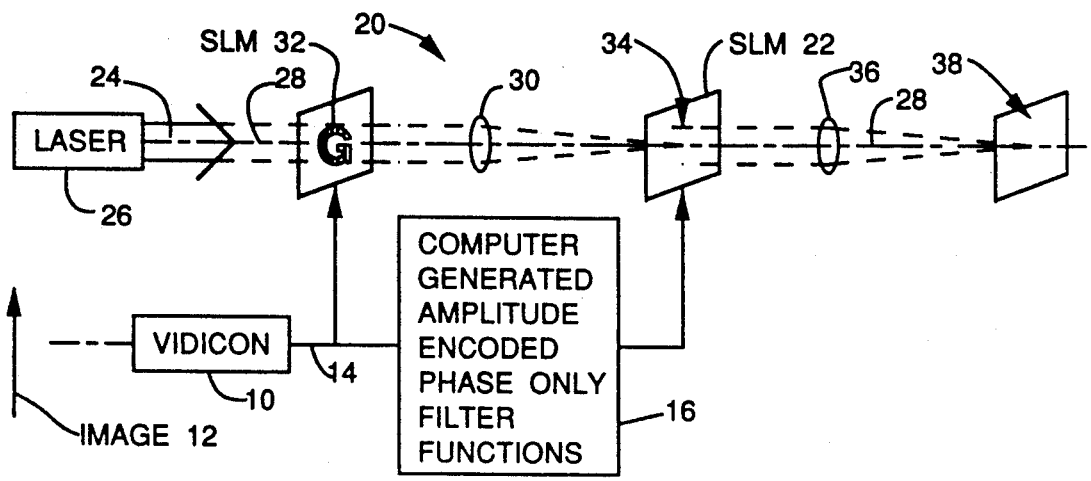

In FIG. 1, a Fourier Transform lens 30 is placed in optical alignment with beam 24 produced by laser 26, along optical axis 28, one focal length f after an input signal 32 formed within a first spatial light modulator 32'. Lens 30 forms the Fourier Transform (having both amplitude and phase information) of signal 32 at a preselected location 34, i.e. a focal length f beyond lens 30. Although all focal lengths in correlator 20 are shown equal in length, they can be of different lengths with corresponding magnification or minification of the image at the output correlation plane 38. The reference filter 22 comprising a second SLM, is placed at location 34 and provides information of another signal which is representative of the object to be compared with or correlated with signal 32. Situated one focal length f, from location 34, is an inverse Fourier Transform lens 36 (i.e. a Fourier Transform lens which is identical to lens 30 except that in operation, the coordinates are inverted). Lens 36 takes the inverse Fourier Transform of the product of signal 32 and the reference filter information signal. This inverse Fourier Transform is formed at location 38, one focal length f from lens 36, and still coincidental with optical axis 28. The inverse Fourier Transform formed at 38 is similar to the mathematical correlation function between signals, in that it shows the similarity between these signals.

In a real time correlation system, vidicon 10 could initially view a series of reference input images (e.g. characters, tanks or other object to be recognized) 12 and the vidicon output pulse train at 14, could be inputted into a small digital computer 16, to create a library of stored reference amplitude encoded binary phase only filter (AE-BPOF) or amplitude encoded phase only (AE-POF) filter functions, one filter function for each reference object to be later correlated with the input image at 12 being viewed for recognition purposes. Alternately, several views of one object can be superimposed to form a composite filter which can recognize an object in any orientation. The Fourier transform filter function for each reference object, may be sequentially produced and stored within computer 16.

The amplitude encoding method of this invention, maps phase information into an amplitude function. The transmission, or amplitude pattern forms the filter. Experiments with amplitude encoded phase filters were performed with the standard four focal length optical correlator shown in FIG. 1, where s(x,y) is the optical or electrical input signal and s(u,v) is its Fourier transform. The filter, H(u,v), is placed in the Fourier transform plane 34 of the first lens, 30. The filtered image is inverse Fourier transformed by the second lens 36 to give the correlation function r(x', y'), at the output at 38. This operation is described by Eq. (1):

$$r(x',y') = FT^{-1}[S(u,v) \cdot H(u,v)] \tag{1}$$

The classically matched filter is defined as:

$$H(u,v) = FT^*[s(x,y)] = S(u,v) \exp[-j\phi(u,v)] \tag{2}$$

where * means the complex conjugate. A phase-only filter is generated by setting the modulus equal to one for all values of H(u,v), the equivalent of dividing by ABS [S(u,v)] giving:

$$H(u,v) = 1 \cdot \exp[-j\phi(u,v)] \tag{3}$$

Figure 2A:
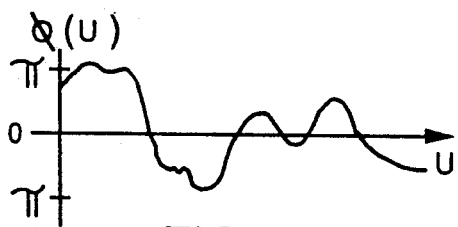

FIG. 2(a) shows in one dimension u the continuous phase function, $\phi](u,v)$. Binarizing the phase to two values (0 and $\pi$) we get $\phi_B(u,v)$, shown in one dimension in FIG. 2(b), giving a BPOF $$H_b(u,v) = \exp[-j\phi_b(u,v)] \tag{4}$$

Figure 2B:
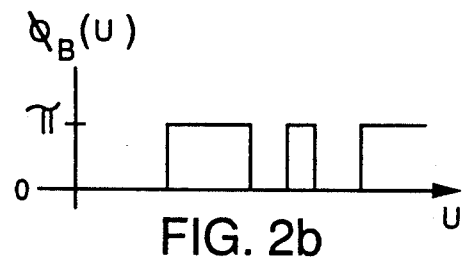
Figure 2C:
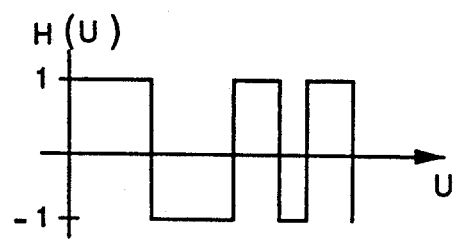
Figure 2D:
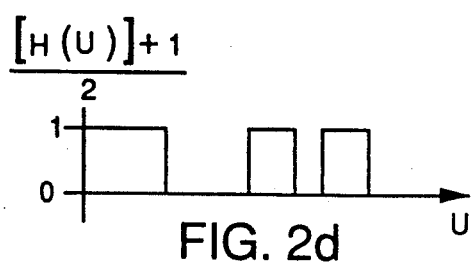

Here phase angles from 0 to $\pi$ are set to 0 while phase angles between 0 to $-\pi$ are set to $\pi$ as shown in FIG. 2(b). Alternatively, phase angles from 0 to $-\pi$ could be set to 0, and phase angles between 0 and $\pi$ could be set to $\pi$. It should be noted that it is not necessary to conjugate the filter function [Eq. (2)], since conjugating a binary phase function is equivalent to multiplying by a constant phase function and thus does not change the observable correlation pattern. Because the phase angles of 0 and $\pi$ in Eq.(4) turn every element into a real number, 1 and $-1$, we can plot an amplitude function, FIG. 2(c). By adding a DC bias to and normalizing, FIG. 2(c), we get a light transmission function shown in FIG. 2(d). The real numbers now are all positive or zero. Because filters are passive devices, the amplitude encoded filter may optionally be normalized to unity for convenience.

Since the BPOF and the AE-BPOF contain the same information, their impulse responses are very similar. The impulse response, h(x,y), is the response of the filter when illuminated with a point source. For the BPOF the impulse response is $$h_B(x,y) = FT^{-1}\{exp[-j\phi_B(u,v)]\} \quad (5)$$

while the AE-BPOF is $$h_A(x,y) = FT^{-1}\{\tfrac{1}{2} + \tfrac{1}{2}exp[-j\phi B(u,v)]\} \quad (6)$$

$$h_A(x,y) = \tfrac{1}{2}\delta(0,0) + \tfrac{1}{2}h_B(x,y) \quad (7)$$

Clearly Eq. (7) shows that the impulse response for the AE-BPOF filter is the same as the BPOF except for a delta function at the origin.

The correlation of an AE-BPOF with the input is $$r(x',y') = FT^{-1}\{S(u,v)\cdot(\tfrac{1}{2}+\tfrac{1}{2}exp[-j\phi_B(u,v)])\} \quad (8)$$

$$r(x',y') = -\tfrac{1}{2}s(x,y) + \tfrac{1}{2}r_B(x,y) \quad (9)$$

The first term of Eq. (8) discloses the inverse Fourier transform of the signal spectrum multiplied by the DC bias. The result in the spatial domain, Equation (9), is that the input image will be observed in the correlation plane. The second term in Eq. (9) is the correlation signal observed in the pure BPOF case. In other words, an AE-BPOF produces the same results as the BPOF except that a reproduction of the input image appears in the correlation plane. This "noise" (in quotations because it is a known quantity, the same signal fed into the input) image could be subtracted from the correlation plane signal, effectively raising the output signal/noise ratio (SNR) at the expense of additional post correlation processing. The correlation plane could be processed digitally on a pixel by pixel basis to subtract the "noise" image using a CCD camera and a frame grabber to load the correlation plane data into a computer. However, this should be carefully considered, as much of the advantage of optical signal processing could be given away by post processing. Fortunately, our experiments and simulations show that the desired correlation peak is typically much larger than their input image which appears in the correlation plane 38.

Rather than subtracting the input "noise" image, it may be advantageously employed; for example, where an operator is monitoring the correlation plane and would like information on where the input camera is pointing or just what is taking place in the input field of view.

We have determined from computer simulations that the amplitude encoded continuous (rather than binary) phase filter (AE-POF) also correlates with a matched image. The AE-POF is modeled by taking the phase information in Eq. (3), adding a DC bias, then normalizing to give $$H_{AP}(u,v) = k[\pi + \phi(u,v)] \quad (10a)$$

when $k = 1/(2\pi)$ $$H_{AP}(u,v) = \tfrac{1}{2} + \frac{\phi(u,v)]}{2\pi} \quad (10b)$$

By analogy with the AE-BPOF, the resulting signal in the correlation plane will have two parts: the input image and the correlation signal. Note that $EXP(-j\phi(u,v))$ in equation (3) is approximately equal to $\phi(u,v)$ and $\pi$ is the D.C. bias term.

In experiments, with various filters, the input image consists of a 128 by 128 pixel image embedded in the lower left corner of a 256 by 256 element zero filled array. The filter pattern was generated on a VAX/8850 computer by taking a fast Fourier Transform, and then extracting the phase. Four different filters were obtained from the filter information: POF, AE-POF, BPOF, and AE-BPOF. Correlation experiments were performed for all four filters by computer simulation, and we were able to physically fabricate a BPOF and an AE-BPOF for experiments on an optical bench.

The BPOF was made by storing the binary phase information on a magnetic tape which was used to fabricate a photomask. See the aforesaid Horner U.S. Pat. No. 4,765,714. Standard VLSI techniques were used to fabricate the BPOF. The photomask consisted of an array of 256 by 256 square elements, each element either clear or opaque chrome. From the size of the input image, the focal length of the lens, the wavelength of the laser source, the size of the filter elements was determined to be 19.0 micrometers. The photomask was contact printed on a fused quartz optical flat which was then ion etched to the depth necessary to produce a half wavelength phase shift as the light passes through the filter. However, it should be noted that a photomask which has the filter information encoded in a transmission pattern actually is the AE-BPOF; in the process of fabricating the BPOF, the AE-BPOF is obtained.

Since both the BPOF and AE-BPOF were in hand, we could check the impulse response on an optical bench. This was easily done by placing the filter in the input plane of FIG. 1, and observing the response in the Fourier plane at 34. The response was an edge enhanced, replicated version of the input image with alternating rows of right side up and upside down images. Replication of the image is a consequence of data sampling. In a paper on binary filtering, it was shown that the impulse response of a binary matched filter contains the image and its inverted conjugate; see J. L. Horner and J. R. Leger, "Pattern Recognition with Binary Phase-only Filters", *Appl. Opt.* 24, 604 (1985) and their U.S. Pat. No. 4765714. The AE-BPOF impulse response, contains a DC spot at the origin, as predicted by Equation (9) while the BPOF response, does not. Other than the DC spot, both impulse responses contain the same information.

In the computer simulation no random noise is added to the system. For performance comparison purposes, noise is defined as the RMS value of all pixel element values below 50% of the full width half maximum correlation intensity (FWHM). This definition is specifically tailored for practical correlation assessment, where a narrow-peak with low side lobes is the desired response. Thus, the signal to noise ratio (SNR) is given by $$SNR = I_{max} \left[ \sum_{n=1}^{N'} \frac{I^2 < 50\%}{N'} \right]^{-\frac{1}{2}} \quad (11)$$

where N' is the number of noise pixels. The secondary maximum was found by setting the correlation peak to zero and looking for the next highest intensity. The table gives the results for all four filters.

TABLE

| Filter | SNR (sim.) | Autocorrelation Results (in intensity) | | | Correlation Width in Pixels | |
|---|---|---|---|---|---|---|
| | | Correlation Peak (sim.) | PSR (sim.) | PSR (exper.) | (sim.) | (exper.) |
| POF | 247 | 126 | 100 | | 1 | |
| AE-POF | 64 | 11 | 10 | | 1 | |
| BPOF | 228 | 46 | 47 | 6.4 | 1 | 3 |
| AE-BPOF | 190 | 11 | 35 | 1.4 | 1 | 4 |

The calculated AE-POF correlation has a SNR of 64 and a PSR to secondary ratio of 10, while the AE-BPOF has a SNR of 190 and PSR of 35, a ratio of about 6:1 in each case.

In the AE-POF case we investigated scaling of the phase angle by two methods: hard clipping and linear scaling. In hard clipping, a thresholding factor of k was used $$H_{AP} = k + \phi_k \quad (12)$$

where
$\phi_k = 0$ if $|\phi| > k$
$\phi_k = \phi$ if $|\phi| < k$
and $-\pi \leq \phi < \pi$ We also studied the effect of linearly scaling the filter by a factor of 1k where 1k varies from 0 to $\pi$ from $$H_{AP} = k\left(1 + \frac{\phi}{\pi}\right) \quad (13)$$

Note the Eq. (13) still contains all undistorted continuous phase information. In linear scaling the factor 1k has no effect on the SNR; which SNR remains a constant 54. However, in the hard clipped case, when k increases, the SNR decreases from 163 to 54.

Autocorrelation experiments were performed on an optical bench with the input image and the AE-BPOF. The correlation peak was measured using a silicon photodetector through a 10 micrometer aperture. The peak was measured to be the most intense object in the correlation plane and had a FWHM (full width half maximum) of 151 micrometers in a total field of 4.98 mm.

In comparison, the correlation peak of the BPOF was measured using the same equipment at the same input image. The BPOF correlation peak had a PSR of 6.5 and a FWHM of 106 micrometers. The table includes the experimentally measured PSR. The measured peak to secondary ratios were lower than predicted from the computer simulations; 6.4 for the BPOF and 1.4 for the AE-BPOF. It should be noted that measured PSR of the BPOF is 4.6 times larger than the AE-BPOF. The computer simulation results in The table assumes a noise free system. While no attempt was made to analyze source of noise, there are several obvious sources of noise, for example: misalignments of the optical bench, mismatch between the transparency size and the filter, and noise in the photodiode. Since a liquid gate was not used in the input plane, phase errors may have been introduced by the transparency. Also, the input transparency was not linearized for the photographic process used, that is, the gamma of the copy film. However, the experimental results did show that a clear correlation peak can be easily detected under less than ideal conditions.

Although this invention has been described with reference to particular embodiments, it will be understood that this invention is also capable of further and other embodiments within the spirit and scope of the appended claims.

What is claimed is:

1. Method of modifying and utilizing a continuous phase-only filter, suitable for use in the Fourier Transform plane of an optical correlator, to enable said filter to be written on a pure amplitude responsive writing device comprising the step of:

adding a bias term K2 to a first filter function $H_{AP}(u,v) = K\phi(u,v)$, said bias term having a value great enough to obtain a second amplitude encoded filter function $H_{AP} = K[k2 + \phi(u,v)]$ where all phase angles are positive real numbers or zero and K is a linear sealing factor.

2. Method of claim 1 further including the step of recording said second amplitude encoded filter function on an amplitude writing device enabling said writing device to be utilized in the Fourier Transform plane of said optical correlator.

3. The method of claim 2 wherein said second filter function is recorded upon an amplitude modulating spatial light modulator.

4. The method of claim 2 wherein said second filter function is recorded on photographic film.

5. The method of claim 1 wherein $K2 = \pi$

6. The method of claim 2 wherein $K2 = \pi$

7. The method of claim 3 wherein $K2 = \pi$

8. Method of producing an amplitude encoded binary phase-only filter which may be recorded upon a pure amplitude writing device comprising the steps of (a) binarizing a first phase only filter $H(u,v) = \exp[-j\phi(u,v)]$; and (b) adding a bias to said first phase only filter, said bias having a value great enough to produce a second amplitude encoded filter having elements of real non-negative numbers, thus enabling said second filter to be written on a pure amplitude responsive writing device.

9. The method of claim 8 wherein step (a) includes binarizing said phase only filter by setting $\phi$ to zero for phase angles from zero to $\pi$ and by setting $\phi$ to $\pi$ for phase angles from $-\pi$ to zero, or vice versa.

10. Method of claim 8 further including the step of normalizing said real numbers all of the same polarity to unity.

11. Method of claim 9 further including the step of normalizing said real numbers all of the same polarity to unity.

12. The method of claim 8 further including the step of recording said second amplitude encoded filter on an amplitude writing device, enabling said writing device to be utilized in the Fourier Transform plane of said optical correlator.

13. The method of claim 9 further including the step of recording said second amplitude encoded filter on an amplitude writing device, enabling said writing device to be utilized in the Fourier Transform plane of said optical correlator.

14. The method of claim 10 further including the step of recording said second amplitude encoded filter on an amplitude writing device, enabling said writing device to be utilized in the Fourier Transform plane of said optical correlator.

15. The method of claim 11 further including the step of recording said second amplitude encoded filter on an amplitude writing device, enabling said writing device to be utilized in the Fourier Transform plane of said optical correlator.

16. The method of claim 12 wherein said second amplitude encoded filter is written upon an amplitude modulating spatial light modulator.

17. The method of claim 13 wherein said second amplitude encoded filter is written upon an amplitude modulating spatial light modulator.

18. The method of claim 14 wherein said second amplitude encoded filter is written upon an amplitude modulating spatial light modulator.

19. The method of claim 15 wherein said second amplitude encoded filter is written upon an amplitude modulating spatial light modulator.

* * * * *

UNITED STATES PATENT AND TRADEMARK OFFICE
CERTIFICATE OF CORRECTION

PATENT NO. : 5,024,508

DATED : 18 June 1991

INVENTOR(S) : Joseph L. Horner

It is certified that error appears in the above-identified patent and that said Letters Patent is hereby corrected as shown below:

Column 6, line 42, "sealing" should read -- scaling --.

Signed and Sealed this

Sixth Day of April, 1993

*Attest:*

STEPHEN G. KUNIN

*Attesting Officer*   *Acting Commissioner of Patents and Trademarks*